United States Patent
Tobita et al.

(10) Patent No.: US 12,088,770 B2
(45) Date of Patent: Sep. 10, 2024

(54) DISPLAY SYSTEM, DISPLAY METHOD, AND DISPLAY PROGRAM FOR DISPLAYING A CONTENT OF ELECTRONIC DOCUMENT

(71) Applicant: Nomura Research Institute, Ltd., Tokyo (JP)

(72) Inventors: Satoshi Tobita, Tokyo (JP); Mitsuhiro Tsunoda, Tokyo (JP); Shinji Ito, Tokyo (JP); Yoshihiro Maeda, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 0 days.

(21) Appl. No.: 18/460,777

(22) Filed: Sep. 5, 2023

(65) Prior Publication Data
US 2024/0205348 A1 Jun. 20, 2024

(30) Foreign Application Priority Data
Dec. 15, 2022 (JP) ................. 2022-199895

(51) Int. Cl.
*H04N 1/00* (2006.01)
*H04N 1/32* (2006.01)

(52) U.S. Cl.
CPC ..... *H04N 1/32128* (2013.01); *H04N 1/00427* (2013.01)

(58) Field of Classification Search
CPC ............ H04N 1/32128; H04N 1/00427; G06F 16/93; G06F 16/338; G06F 16/248; G06F 16/24573
See application file for complete search history.

(56) References Cited

U.S. PATENT DOCUMENTS

| | | | | |
|---|---|---|---|---|
| 2004/0083433 | A1* | 4/2004 | Takeya | G06F 16/93 715/269 |
| 2020/0296258 | A1* | 9/2020 | Sevilla | H04N 1/00824 |
| 2023/0306032 | A1* | 9/2023 | Maruyama | G06F 16/248 |

FOREIGN PATENT DOCUMENTS

JP 2011-65374 A 3/2011

* cited by examiner

*Primary Examiner* — Iriana Cruz
(74) *Attorney, Agent, or Firm* — RANKIN, HILL & CLARK LLP

(57) ABSTRACT

A display system including: a document content acquisition unit that acquires, on a basis of bibliographic information that includes storage location information indicating a storage location of each of a plurality of electronic documents to be displayed and is related to a bibliographic matter of each of the plurality of electronic documents, document content information indicating a content of at least one electronic document among the plurality of electronic documents stored in the storage location; and a display unit that displays, on a basis of correspondence information in which each of a plurality of items set in advance is associated with a description position in the at least one electronic document, and the document content information, content indicated by the document content information corresponding to the description position in the at least one electronic document, on a user terminal of a user for each item.

11 Claims, 10 Drawing Sheets

CORRESPONDENCE INFORMATION

| DOCUMENT ID | FIRST ITEM INFORMATION | | ... |
|---|---|---|---|
| | ITEM ID | DESCRIPTION POSITION INFORMATION | ... |
| D0001 | I0001 | (page1, x1, y1) TO (page1, x2, y2) | ... |
| ... | ... | ... | ... |

FIG. 2

BIBLIOGRAPHY INFORMATION

| DOCUMENT ID | NAME INFORMATION | ISSUING ENTITY INFORMATION | ISSUANCE TIME INFORMATION | TYPE INFORMATION | STORAGE LOCATION INFORMATION |
|---|---|---|---|---|---|
| D0001 | INTEGRATED REPORT IN FY2022 | C0001 | FY2022 | INTEGRATED REPORT | https://www. |
| D0002 | SUSTAINABILITY REPORT IN FY2022 | C0001 | FY2022 | SUSTAINABILITY REPORT | https://www. |
| ... | ... | ... | ... | ... | ... |

FIG. 3

CORRESPONDENCE INFORMATION

| DOCUMENT ID | FIRST ITEM INFORMATION | | ... |
|---|---|---|---|
| | ITEM ID | DESCRIPTION POSITION INFORMATION | ... |
| D0001 | I0001 | (page1, x1, y1) TO (page1, x2, y2) | ... |
| ... | ... | ... | ... |

FIG. 7
COMPARISON OF REPORT OF COMPANY A (MOST RECENT INFORMATION)
| EVALUATION ITEM | SCORE | INDEPENDENT EVALUATION ITEM | ANNUAL REPORT 2022 |
|---|---|---|---|
| G107. DIALOGUE WITH INVESTORS | 3/5 | 01. STAKEHOLDERS | 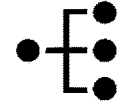 |
| | | 02. DIALOGUE WITH STAKEHOLDERS | ... |
| E201. CLIMATE CHANGE RISK | 4/5 | 03. OPPORTUNITY AND RISK REGARDING CLIMATE CHANGE | |
| ... | | ... | ... |
OUR COMPANY'S STAKEHOLDERS
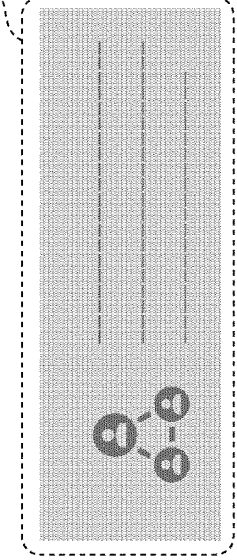

FIG. 8

DIRECTOR INFORMATION

| NAME ID | DIRECTOR INFORMATION | | | |
|---|---|---|---|---|
| | FIRST DIRECTOR INFORMATION | | | SECOND DIRECTOR INFORMATION |
| | BUSINESS OPERATOR ID | ATTRIBUTE INFORMATION | TIME INFORMATION | |
| B0001 | C0001 | EXTERNAL/ NOMINATING COMMITTEE/ AUDIT COMMITTEE/ INDEPENDENT DIRECTOR | FY2019 TO | ... |
| B0002 | C0001 | EXTERNAL/ NOMINATING COMMITTEE/ AUDIT COMMITTEE/ INDEPENDENT DIRECTOR | FY2015 TO FY2018 | ... |
| ... | ... | ... | ... | ... |

FIG. 9

TOKKYO TARO — 901

STATUS OF CONCURRENT POSITIONS OF EXTERNAL DIRECTORS

902

| COMPANY NAME | 2022/4 | 2022/6 | ... |
|---|---|---|---|
| COMPANY A | ○ | ○ | ... |
| COMPANY B | — | ○ | ... |

903

| COMPANY NAME | NOMINATING COMMITTEE | COMPENSATION COMMITTEE | AUDIT COMMITTEE | INDEPENDENT DIRECTOR | SUPPLEMENTAL EXPLANATION FOR CONFORMANCE ITEM | REASON FOR SELECTION |
|---|---|---|---|---|---|---|
| COMPANY A | ○ | — | ○ | ○ | STATUS OF IMPORTANT CONCURRENT POSITION ... | EXPECTED TO SUPERVISE THE MANAGEMENT OF OUR COMPANY WITH BROAD EXPERIENCE IN FINANCE AND ACCOUNTING FIELD, .... |
| COMPANY B | ○ | — | ○ | ○ | STATUS OF IMPORTANT CONCURRENT POSITION ... | EXPECTED TO GIVE USEFUL ADVICES BASED ON EXPERT KNOWLEDGE AND .... |

[ OUTPUT ] — 904

DISPLAY SYSTEM, DISPLAY METHOD, AND DISPLAY PROGRAM FOR DISPLAYING A CONTENT OF ELECTRONIC DOCUMENT

BACKGROUND OF THE INVENTION

1. Technical Field

The present invention relates to a display system, a display method, and a display program.

2. Description of the Related Art

Conventionally, there is a known technique of acquiring information of an electronic document published on a Web server and displaying the information on a user terminal of a user.

For example, JP 2011-65374 A discloses a system that displays on a display unit of a client an electronic document published on a Web server, acquires an element selected by the client from the electronic document being displayed, generates image data from the acquired element, and transmits the generated image data.

SUMMARY OF THE INVENTION

In the system described in JP 2011-65374 A, a print screen of the image data generated based on the element selected by the client is displayed on a client screen. However, in the system described in JP 2011-65374 A, since the client needs to select an element after understanding the contents of the electronic document, the client cannot easily understand the contents of the electronic document in a display mode of JP 2011-65374 A.

Therefore, an object of the present invention is to provide a display system, a display method, and a display program capable of displaying a content of an electronic document in an easy-to-understand format.

A display system according to one aspect of the present invention includes: a document content acquisition unit that acquires, on a basis of bibliographic information that includes storage location information indicating a storage location of each of a plurality of electronic documents to be displayed and is related to a bibliographic matter of each of the plurality of electronic documents, document content information indicating a content of at least one electronic document among the plurality of electronic documents stored in the storage location; and a display unit that displays, on a basis of correspondence information in which each of a plurality of items set in advance is associated with a description position in the at least one electronic document, and the document content information, content indicated by the document content information corresponding to the description position in the at least one electronic document, on a user terminal of a user for each item.

In a display method according to one aspect of the present invention, a computer: acquires, on a basis of bibliographic information that includes storage location information indicating a storage location of each of a plurality of electronic documents to be displayed and is related to a bibliographic matter of each of the plurality of electronic documents, document content information indicating a content of at least one electronic document among the plurality of electronic documents stored in the storage location; and displays, on a basis of correspondence information in which each of a plurality of items set in advance is associated with a description position in the at least one electronic document, and the document content information, content indicated by the document content information corresponding to the description position in the at least one electronic document, on a user terminal of a user for each item.

A display program according to one aspect of the present invention causes a computer to implement: a document content acquisition unit that acquires, on a basis of bibliographic information that includes storage location information indicating a storage location of each of a plurality of electronic documents to be displayed and is related to a bibliographic matter of each of the plurality of electronic documents, document content information indicating a content of at least one electronic document among the plurality of electronic documents stored in the storage location; and a display unit that displays, on a basis of correspondence information in which each of a plurality of items set in advance is associated with a description position in the at least one electronic document, and the document content information, content indicated by the document content information corresponding to the description position in the at least one electronic document, on a user terminal of a user for each item.

In the present invention, a "unit" does not simply mean a physical means, and includes a case where a function of the "unit" is implemented by software. In addition, the function of one "unit" or device may be implemented by two or more physical means, devices, or pieces of software, and the function of two or more "units" or devices may be implemented by one physical means, one device, or a piece of software.

With the present invention, it is possible to provide a display system, a display method, and a display program capable of displaying a content of an electronic document in an easy-to-understand format.

BRIEF DESCRIPTION OF THE DRAWINGS

FIG. 2 is a diagram illustrating an example of bibliographic information stored in a storage unit;

FIG. 3 is a diagram illustrating an example of correspondence information stored in the storage unit;

FIG. 7 is a diagram illustrating an example of display of an electronic document by a selection display unit;

FIG. 8 is a diagram illustrating an example of director information stored in the storage unit;

FIG. 9 is a diagram illustrating an example of display of the director information by the display unit.

DETAILED DESCRIPTION

Figure 1:
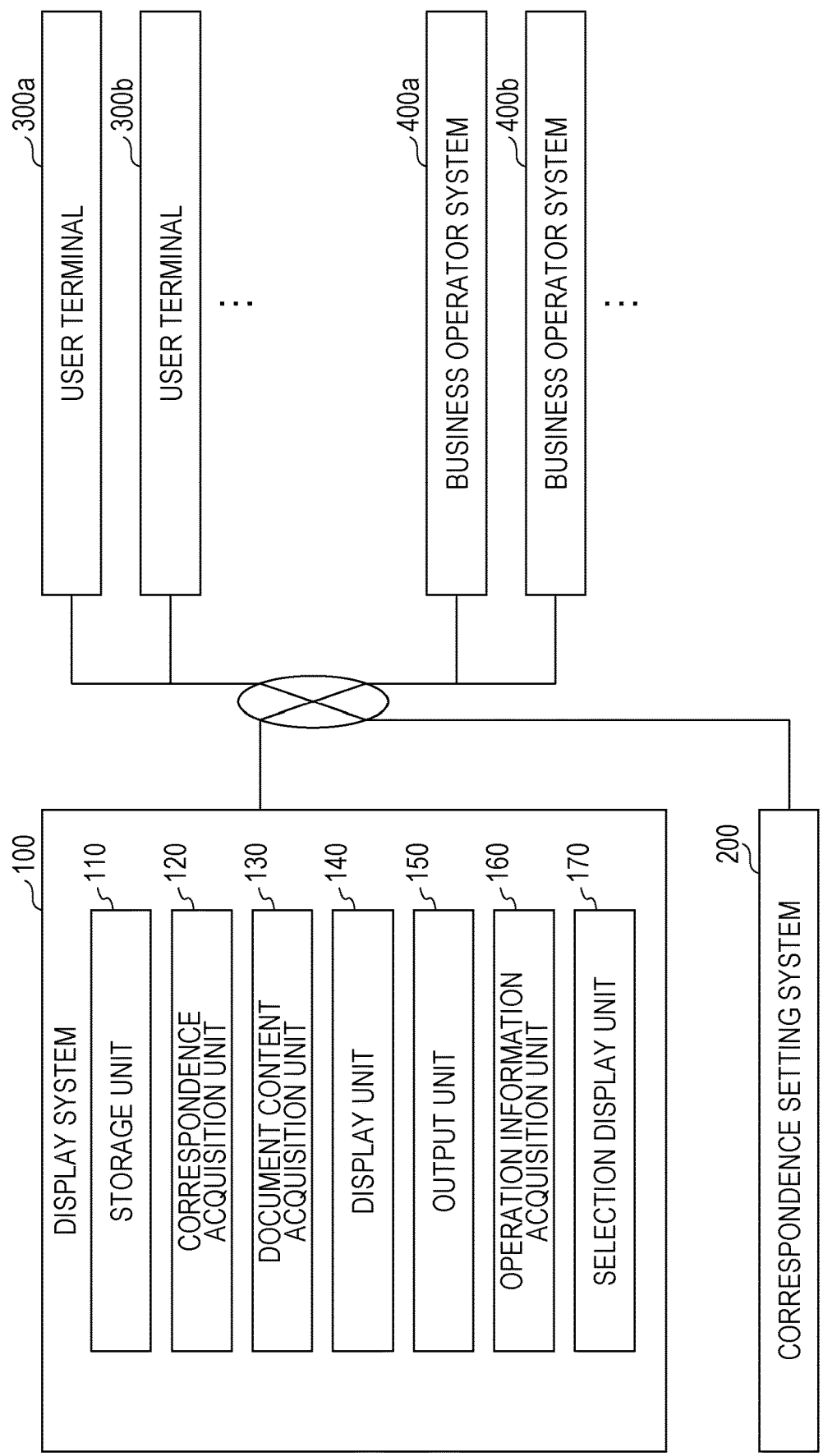
FIG. 1 is a diagram illustrating a configuration of a display system according to an embodiment of the present invention.

Preferred embodiments of the present invention will be described with reference to the accompanying drawings. FIG. 1 is a diagram illustrating a configuration of a display system 100 according to an embodiment of the present invention.

The display system 100 is a system communicably connected to a correspondence setting system 200, user terminals 300 (300a, 300b), and business operator systems 400 (400a, 400b) via a network such as the Internet.

The display system 100 displays a content at a description position corresponding to an item in at least one electronic document among a plurality of electronic documents to be displayed, on the user terminal 300 for each preset item.

Furthermore, for example, the display system 100 can display a content at a description position corresponding to an item in the plurality of electronic documents to be displayed, on the user terminal 300 for each item, for each issuance time, for each issuing entity, or for each type. Details of the display system 100 will be described later.

The correspondence setting system 200 is an information processing system that generates correspondence information in which each of a plurality of items set in advance is associated with a description position in each of the electronic documents and provides the correspondence information to the display system 100.

In the correspondence setting system 200, a setting person can generate the correspondence information while referring to an electronic document. Furthermore, the correspondence setting system 200 may generate the correspondence information using machine learning. Details of the correspondence information and the correspondence setting system 200 will be described later.

Note that the correspondence setting system 200 may be an information processing system independent of the display system 100, or may be information processing incorporated in the display system 100.

The user terminal 300 is a computer used by a user of the display system 100, and is a smartphone, a tablet terminal, a personal computer, or the like.

The user can access the display system 100 through the user terminal 300, and upon receiving display of an electronic document caused by the display system 100 to the user terminal 300, refer to the displayed electronic document.

The business operator system 400 is an information processing system that stores the plurality of electronic documents to be displayed. Each of the business operator system 400 (for example, the business operator system 400a and the business operator system 400b) may be an information processing system managed by an issuing entity (for example, a business operator) of each of the plurality of electronic documents to be displayed.

The business operator system 400 provides information indicating the content of an electronic document stored in the business operator system 400 (specifically, for example, a storage unit of the business operator system 400) to the display system 100. Note that the business operator system 400 may provide information indicating the content of an electronic document stored in the business operator system 400 (specifically, for example, a storage unit of the business operator system 400) to another information processing system, and the other information processing system may provide information indicating the content of the electronic document to the display system 100.

Note that, in FIG. 1, two user terminals 300 and two business operator systems 400 are illustrated, but there may be three or more user terminals 300 and three or more business operator systems 400.

Next, details of the display system 100 will be described. The display system 100 includes a storage unit 110, a correspondence acquisition unit 120, a document content acquisition unit 130, a display unit 140, an output unit 150, an operation information acquisition unit 160, and a selection display unit 170. Each unit illustrated in FIG. 1 can be implemented, for example, by using a storage area or causing a processor to execute a program stored in the storage area.

The storage unit 110 stores information to be processed in the display system 100. The storage unit 110 can store, for example, bibliographic information, correspondence information, document content information, operation information, and director information to be described later.

The storage unit 110 stores the bibliographic information in advance. For example, the display system 100 acquires bibliographic information according to an operation of an administrator or a user of the display system 100, and stores it in the storage unit 110.

Here, the bibliographic information is bibliographic information related to each bibliographic matter of the plurality of electronic documents to be displayed. The bibliographic information includes, for example, name information indicating a name of the electronic document, issuing entity information indicating an issuing entity (for example, a business operator) of the electronic document, issuance time information indicating an issuance time (for example, the FY of issuance) of the electronic document, type information indicating a type of the electronic document, and storage location information indicating a storage location of the electronic document.

The name information may be information indicating a file name of the electronic document, or may be information indicating a title (for example, "annual report 2022", "sustainability report in FY2021", or the like) of the electronic document.

The issuing entity information may be, for example, information indicating the name itself of the issuing entity (for example, "company A"), or may be information for identifying the issuing entity (an ID such as a company code).

The issuance time information may be, for example, information indicating fiscal year, year, or year/month/date of issuance of the electronic document.

The type information is information indicating a type of the electronic document. Here, the type includes, for example, an integrated report (annual report, yearly status report), a sustainability report, a corporate governance report, an extraordinary report, a securities report, a hearing report, and website information. Note that the type of the electronic document that can be processed by the display system 100 is not limited the above types.

The storage location information may be, for example, information indicating a uniform resource locator (URL) in which the electronic document is stored.

In this manner, the display system 100 can process, for example, a report in which non-financial information is described. In general, collection of non-financial information of a company involves many personal tasks. Also, the format of non-financial reports may vary from company to company. Therefore, it may take a lot of time to collect non-financial information of a company. For example, since the display system 100 can process a report in which non-financial information is described, the user can refer to the report in which the non-financial information is described, for example, in an easy-to-understand format through the display system 100.

Note that the display system 100 can process an electronic document of a report in which information other than non-financial information is described.

FIG. 2 is a diagram illustrating an example of bibliographic information stored in the storage unit 110. The bibliographic information stored in the storage unit 110 includes, for example, a document ID, name information, issuing entity information, issuance time information, type information, and storage location information. Here, the document ID is information for identifying an electronic document to be processed in the display system 100.

The correspondence acquisition unit 120 acquires correspondence information in which each of a plurality of items set in advance is associated with a description position in each of the electronic documents, and stores the correspondence information in the storage unit 110. The correspondence acquisition unit 120 can acquire the correspondence information from, for example, the correspondence setting system 200.

Here, the plurality of items set in advance are items corresponding to contents described in the electronic document.

The item may be an item that is required to be described or disclosed according to, for example, a law, a guideline defined by a predetermined organization, custom (in particular, commercial custom), or the like. Specifically, for example, in the report A, when the description of the item a is required by a law or the like, the item a is one of the plurality of items set in advance.

Furthermore, the item may be an item that is arbitrarily set. In this case, the item may be set by an administrator or a user of the correspondence setting system 200 or the administrator or the user of the display system 100. Furthermore, in this case, the item corresponds to an item required to be described or disclosed according to a law, a guideline defined by a predetermined organization, custom (in particular, commercial custom), or the like, and a plurality of the items may be integrated into one or may be provided with a new item, so that the item is set.

Furthermore, the item may be an item further set to an arbitrarily set item. Specifically, an item required to be described or disclosed according to a law, a guideline defined by a predetermined institution, custom (in particular, commercial custom), or the like may be set as the first item, an item corresponding to the first item and set by the administrator of the correspondence setting system 200 may be set as the second item, and an item corresponding to the second item and set by the user of the display system 100 may be set as the third item. As a result, the user can customize the item independently, and convenience of the user is improved. For example, the correspondence setting system 200 can set a correspondence in which each of a plurality of items is associated with a description position in each of the electronic documents according to, for example, an operation of an information terminal by the setting person (the administrator or the user of the correspondence setting system 200).

Specifically, in the correspondence setting system 200, the setting person operates the information terminal to specify the description position where the content corresponding to each of the plurality of items (for example, the item a) is described, while referring to the electronic document. At this time, for example, the information terminal of the setting person determines a range selected by the setting person through a selection operation (for example, drag operation or touch operation) as a description position where a content corresponding to an item (for example, the item a) is described. Then, correspondence information in which the description position selected by the setting person is associated with the corresponding item is generated, and the correspondence acquisition unit 120 acquires the generated correspondence information.

Furthermore, the correspondence setting system 200 may generate the correspondence information using machine learning. At this time, the correspondence setting system 200 may generate the correspondence information on the basis of analysis information obtained by analyzing a text described in the electronic document.

Specifically, for example, the correspondence information in a target electronic document may be generated on the basis of a learning model that has learned the correspondence information, as learning data, in another electronic document (for example, an electronic document in past fiscal year or an electronic document issued by another business operator). Then, the correspondence acquisition unit 120 acquires the generated correspondence information.

Note that electronic documents of the same type issued by the same business operator in different fiscal years generally inherit layout, and thus a learning model can be generated. In addition, electronic documents of the same type issued by different issuing entities or issued in different fiscal years may have similar layout, and thus a learning model can be generated.

Furthermore, the correspondence setting system 200 may generate the correspondence information by utilizing an operation by the setting person and the machine learning, and the correspondence acquisition unit 120 may acquire the generated correspondence information. As a result, the correspondence acquisition unit 120 can acquire more accurate correspondence information.

FIG. 3 is a diagram illustrating an example of correspondence information stored in a storage unit 110. The correspondence information stored in the storage unit 110 includes, for example, a document ID and item information (for example, first item information, second item information, and the like), and each of the item information includes, for example, an item ID and description position information.

The item ID is information for identifying each of a plurality of items set in advance in the display system 100. The description position information is information indicating a position (for example, an area specified by the number of pages, the X coordinate, and the Y coordinate) in an electronic document in which the content corresponding to the item is described.

The document content acquisition unit 130 acquires, on the basis of the bibliographic information stored in the storage unit 110, document content information indicating the content of at least one electronic document among the plurality of electronic documents stored in the storage location indicated by the storage location information included in the bibliographic information.

That is, the document content acquisition unit 130, for example, accesses the business operator system 400 and acquires the document content information of an electronic document stored in a storage unit of the business operator system 400. The document content acquisition unit 130 can acquire the document content information from the business operator system 400 by, for example, web scraping.

At this time, the document content acquisition unit 130 does not acquire (or, for example, does not download) the electronic document itself (for example, a file in portable document format (PDF)) stored in the storage unit of the business operator system 400, but acquires document content information (for example, a data entity of the electronic document). As a result, the display unit 140 to be described later can display the content of the electronic document on the user terminal 300 without infringing the copyright of the electronic document.

In addition, the document content acquisition unit 130 can acquire the document content information of each of a plurality of electronic documents issued at different times on the basis of bibliographic information (more specifically, the issuance time information included in the bibliographic information). As a result, the display unit 140 to be described later can display a plurality of electronic documents issued at different times on the user terminal 300.

In addition, the document content acquisition unit 130 can acquire the document content information of each of a plurality of electronic documents issued by different issuing entities on the basis of bibliographic information (more specifically, the issuing entity information included in the bibliographic information). As a result, the display unit 140 to be described later can display a plurality of electronic documents issued by different issuing entities on the user terminal 300.

In addition, the document content acquisition unit 130 can acquire the document content information of each of a plurality of electronic documents of different types on the basis of bibliographic information (more specifically, the type information included in the bibliographic information). As a result, the display unit 140 to be described later can display a plurality of electronic documents of different types on the user terminal 300.

The display unit 140 displays, on the basis of the correspondence information and the document content information, the content indicated by the document content information corresponding to the description position in at least one electronic document, on the user terminal 300 for each item.

Furthermore, in a case where the document content acquisition unit 130 acquires the document content information of each of a plurality of electronic documents issued at different times, the display unit 140 can display the content indicated by the document content information corresponding to the description position in the electronic document, on the user terminal 300 for each item and for each issuance time.

Furthermore, in a case where the document content acquisition unit 130 acquires the document content information of each of a plurality of electronic documents issued by different issuing entities, the display unit 140 can display the content indicated by the document content information corresponding to the description position in the electronic document, on the user terminal 300 for each item and for each issuing entity.

Furthermore, in a case where the document content acquisition unit 130 acquires the document content information of each of a plurality of electronic documents of different types, the display unit 140 can display the content indicated by the document content information corresponding to the description position in the electronic document, on the user terminal 300 for each item and for each type.

The output unit 150 outputs information indicating the content of the electronic document displayed on the user terminal 300 for each item, and provides the information to a user terminal 300.

The output unit 150 can output, for example, information indicating the content of the electronic document for each item displayed on the user terminal 300 to an external information processing system. Specifically, for example, the output unit 150 can provide text information of the electronic document displayed on the user terminal 300 to an external information processing system (for example, a user terminal 300) using an application program interface (API). As a result, the user can analyze the display result by the display system 100 and use the display result for, for example, business documents and business studies.

Next, an operation of the user on the display system 100 through the user terminal 300 will be described.

First, the user searches for an electronic document desired to be displayed by the user on a search screen displayed on the user terminal 300 according to predetermined processing in the display system 100. At this time, the user searches for an electronic document using, for example, a keyword (that is, for example, the issuing entity, the year of issuance, or the type of the electronic document) corresponding to the bibliographic information, a keyword described in the electronic document, or the like. The display system 100 searches for an electronic document in accordance with predetermined processing, and displays information (for example, bibliographic information) indicating a candidate electronic document on the user terminal 300.

The user transmits a request for displaying the electronic document to the display system 100 through the user terminal 300. Specifically, for example, the user selects a displayed candidate of the electronic document through the user terminal 300, and then selects a button for requesting display. The display system 100 receives a request for displaying the selected electronic document candidate from the user terminal 300.

In response to the display request by the user, the document content acquisition unit 130 acquires the document content information of the electronic document corresponding to the display request of the user, and the display unit 140 displays the electronic document on the user terminal 300.

As described above, the display system 100 (in particular, the document content acquisition unit 130 and the display unit 140) can access the business operator system 400 and display the electronic document stored in the business operator system 400 on the user terminal 300 in response to the display request by the user. As a result, the display unit 140 can display the content of the electronic document on the user terminal 300 without infringing the copyright of the electronic document.

Figure 4:
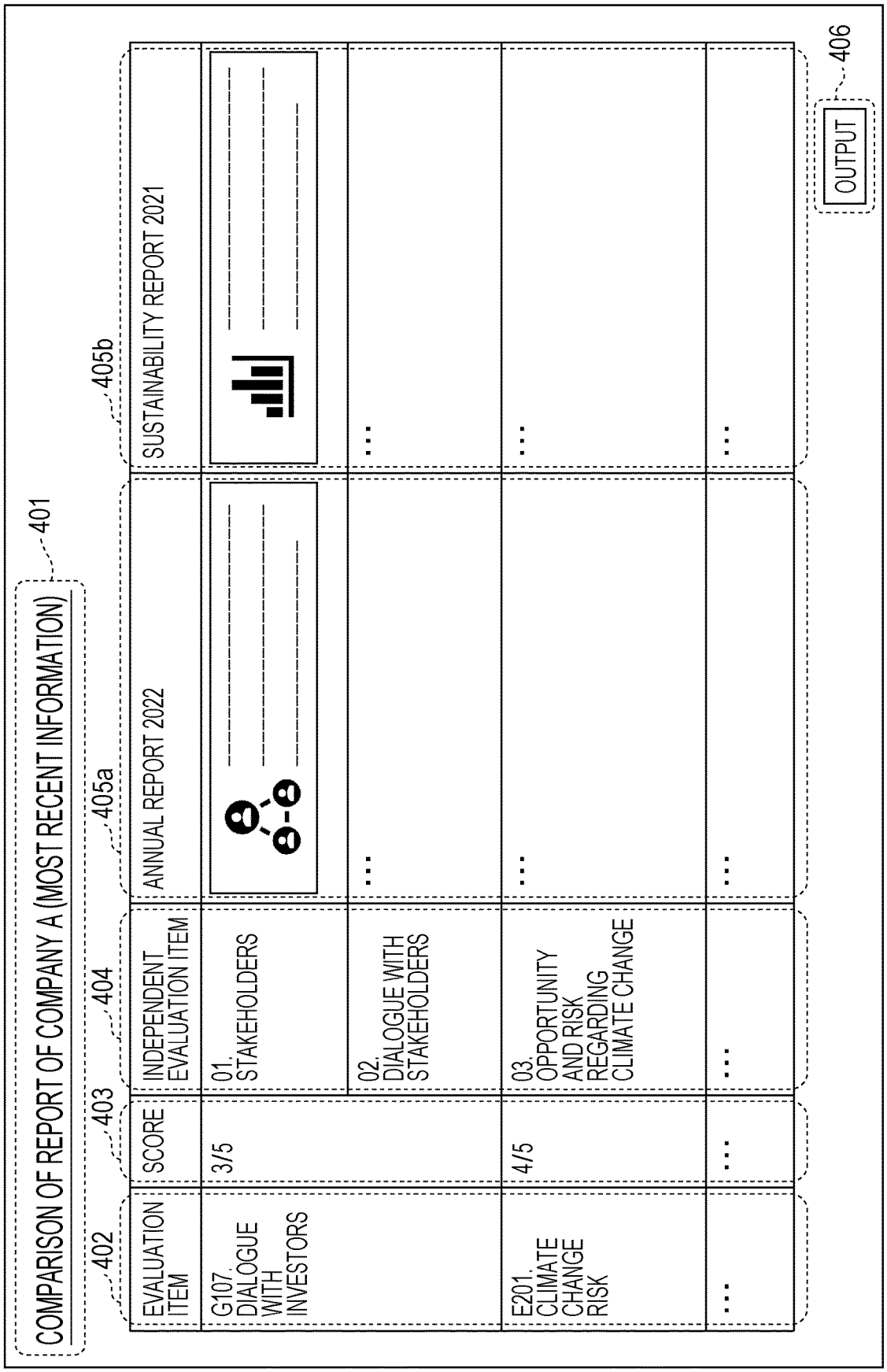
FIG. 4 is a diagram illustrating an example of display of an electronic document by a display unit.

FIG. 4 is a diagram illustrating an example of display of an electronic document by the display unit 140. FIG. 4 illustrates an example in which the display unit 140 displays a plurality of electronic documents issued by the same issuing entity.

The screen illustrated in FIG. 4 includes an area 401 that displays a title indicating an outline of the electronic document being displayed, an area 402 that indicates a plurality of items, an area 403 that indicates an evaluation result (score) based on the description content for each item, an area 404 that indicates an item arbitrarily set corresponding to the item in the area 402, an area 405 (405*a*, 405*b*) that displays the content of the electronic document for each item, and an area 406 that indicates a button for outputting the displayed content.

In the area 405, contents described in electronic documents of different types (here, the annual report 2022 and the sustainability report 2021) issued by the same issuing entity (here, the company A) stored in storage locations (here, the business operator system 400 of the company A) indicated by the storage location information are displayed. That is, in the area 405, information (for example, image data) indicating the content at the description position corresponding to the item in the electronic document stored in the storage location is displayed.

Note that the score displayed in the area 403 may be a score calculated by predetermined score calculation processing provided in the display system 100, or may be a score calculated by the user of the display system 100. The score may be calculated, for example, according to completeness (for example, the number of characters, the number of lines, the number of pages, the number of images, and the like) of a description content corresponding to an item. In addition, the area 403 need not be displayed on the screen illustrated in FIG. 4.

In addition, both of the items in the area 402 and the area 404 may be displayed on the screen illustrated in FIG. 4, or only one of the items in the area 402 and the area 404 may be displayed. Furthermore, an area that displays items arbitrarily set corresponding to the items in the area 402 or the area 404 may be further provided.

Figure 5:
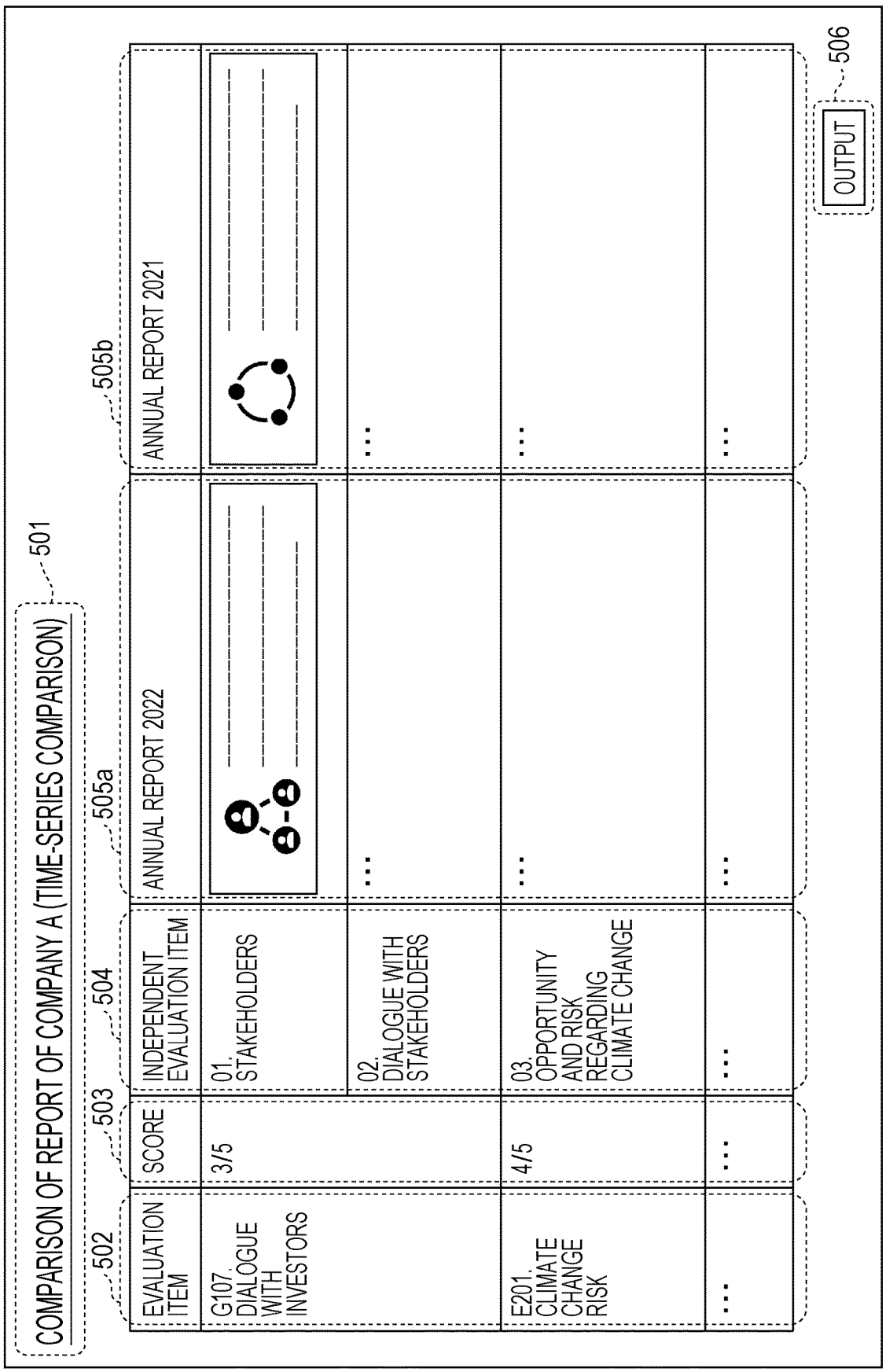
FIG. 5 is a diagram illustrating an example of display of an electronic document by the display unit.

FIG. 5 is a diagram illustrating an example of display of an electronic document by the display unit 140. FIG. 5 illustrates an example in which the display unit 140 displays a plurality of electronic documents issued by the same issuing entity in different fiscal years.

The screen illustrated in FIG. 5 includes an area 501 that displays a title indicating an outline of the electronic document being displayed, an area 502 that indicates a plurality of items, an area 503 that indicates an evaluation result (score) based on the description content for each item, an area 504 that indicates an item arbitrarily set corresponding to the item in the area 502, an area 505 (505a, 505b) that displays the content of the electronic document for each item, and an area 506 that indicates a button for outputting the displayed content.

In the area 505, contents described in electronic documents (here, the annual reports issued in FY2022 and FY2021) issued by the same issuing entity (here, the A company) in different fiscal years stored in storage locations (here, the business operator system 400 of the company A) indicated by the storage location information are displayed. That is, in the area 505, information (for example, image data) indicating the content at the description position corresponding to the item in the electronic document stored in the storage location is displayed.

Note that the score displayed in the area 503 may be a score calculated by predetermined score calculation processing provided in the display system 100, or may be a score calculated by the user of the display system 100. The score may be calculated, for example, according to completeness (for example, the number of characters, the number of lines, the number of pages, the number of images, and the like) of a description content corresponding to an item. In addition, the area 503 need not be displayed on the screen illustrated in FIG. 5.

In addition, both of the items in the area 502 and the area 504 may be displayed on the screen illustrated in FIG. 5, or only one of the items in the area 502 and the area 504 may be displayed. Furthermore, an area that displays items arbitrarily set corresponding to the items in the area 502 or the area 504 may be further provided.

Figure 6:
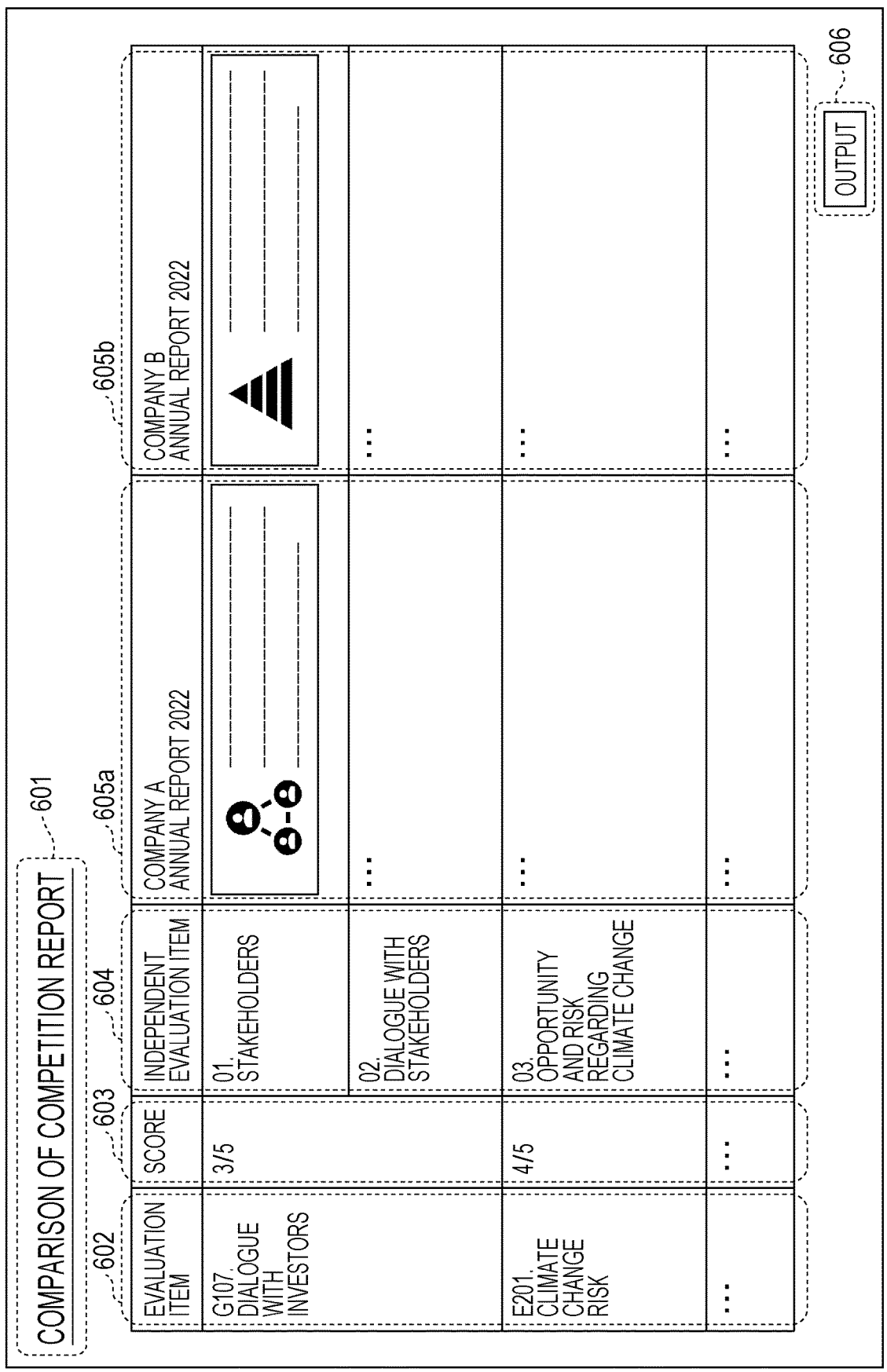
FIG. 6 is a diagram illustrating an example of display of an electronic document by the display unit.

FIG. 6 is a diagram illustrating an example of display of an electronic document by the display unit 140. FIG. 6 illustrates an example in which the display unit 140 displays a plurality of electronic documents issued by different issuing entities.

The screen illustrated in FIG. 6 includes an area 601 that displays a title indicating an outline of the electronic document being displayed, an area 602 that indicates a plurality of items, an area 603 that indicates an evaluation result (score) based on the description content for each item, an area 604 that indicates an item arbitrarily set corresponding to the item in the area 602, an area 605 (605a, 605b) that displays the content of the electronic document for each item, and an area 606 that indicates a button for outputting the displayed content.

In the area 605, contents described in electronic documents (here, the annual reports issued in FY2022) issued by different issuing entities (here, the company A and the company B) stored in storage locations (here, the business operator systems 400 of the company A and the company B) indicated by the storage location information are displayed. That is, in the area 605, information (for example, image data) indicating the content at the description position corresponding to the item in the electronic document stored in the storage location is displayed.

Note that the score displayed in the area 603 may be a score calculated by predetermined score calculation processing provided in the display system 100, or may be a score calculated by the user of the display system 100. The score may be calculated, for example, according to completeness (for example, the number of characters, the number of lines, the number of pages, the number of images, and the like) of a description content corresponding to an item. In addition, the area 603 need not be displayed on the screen illustrated in FIG. 6.

In addition, both of the items in the area 602 and the area 604 may be displayed on the screen illustrated in FIG. 6, or only one of the items in the area 602 and the area 604 may be displayed. Furthermore, an area that displays items arbitrarily set corresponding to the items in the area 602 or the area 604 may be further provided.

The operation information acquisition unit 160 acquires operation information regarding the operation of the user terminal 300 by the user. Here, the operation information is operation information regarding an operation (for example, a selection operation using a keyboard, a click operation using a mouse, a touch operation using a finger, or the like) in which the user selects a content on the user terminal 300 displayed by the display unit 140.

The user operates the user terminal 300 to select, for example, an electronic document on the user terminal 300 displayed by the display unit 140. At this time, the user selects, for example, an area (that is, for example, the areas 405, 505, and 605) in which the contents of the electronic documents are displayed. The operation information acquisition unit 160 acquires operation information regarding the selection operation.

On the basis of the operation information, the selection display unit 170 displays at least one electronic document stored in a storage location indicated by the storage location information on the user terminal 300 according to a selection operation by the user through the user terminal 300.

At this time, the document content acquisition unit 130 may acquire the document content information of the electronic document corresponding to the selection operation again, and the selection display unit 170 may display the acquired document content information on the user terminal 300.

When displaying at least one electronic document stored in the storage location indicated by the storage location information according to the selection operation by the user through the user terminal 300, the selection display unit 170 can display on the user terminal 300 at least a part of the page of the electronic document including the description position displayed on the user terminal 300. That is, in this case, for example, the selection display unit 170 can display at least a part of the page in which the content indicated at the description position corresponding to the item selected by the user through the user terminal 300 is described, instead of displaying the cover of the selected electronic document.

Furthermore, at this time, the selection display unit 170 can display on the user terminal 300 at least a part of the page of the electronic document including the description position with highlighting a portion corresponding to the description position displayed on the user terminal 300. As a result, the user can easily understand the description position where the content corresponding to the item is described in the electronic document that can be said to be the original.

FIG. 7 is a diagram illustrating an example of display of an electronic document by a selection display unit 170. The screen illustrated in FIG. 7 corresponds to the screen illustrated in FIG. 4, and is a screen when the user who has received the display of the screen illustrated in FIG. 4 performs a selection operation to select a content (in particular, the content displayed at the top column of the area 405a) to be displayed in the area 405a.

According to a selection operation by the user, the selection display unit 170 displays an area 701 on the user terminal 300. In the area 701, a page in which the content selected by the user is described is displayed.

The selection display unit 170 can further highlight a portion (area 702) in which the content selected by the user is described in the page displayed in the area 701. In the screen illustrated in FIG. 7, a portion corresponding to the area 702 is highlighted by a rectangle. Note that the highlighting method is not limited to the method illustrated in FIG. 7, and may be, for example, a method of surrounding with a frame of a specific color, a method of superimposing and displaying rectangles of a specific color and transparency, a method of highlighting a character portion with a marker or the like, a method of highlighting a description position with a specific symbol (for example, an arrow), or a method of displaying a highlighted content at the top portion or the central portion of the area 702.

Next, display processing of the director information in the display system 100 will be described.

The storage unit 110 stores the director information. The director information is information on a director of a business operator.

For example, on the basis of the document content information, the display system 100 may analyze the text of an electronic document to be displayed, extract the director information, and store the director information in the storage unit 110. Furthermore, the display system 100 may receive acquisition or correction of the director information on the basis of an operation of the administrator or the user of the display system 100 and store the received information in the storage unit 110.

FIG. 8 is a diagram illustrating an example of director information stored in the storage unit 110. The director information stored in the storage unit 110 includes, for example, a name ID, and director information (for example, first director information, second director information, and the like), and each of the director information includes, for example, a business operator ID, attribute information, and term information.

The name ID is information for identifying the director information. The business operator ID is information for identifying a business operator for which the director executes or supervises operations. The business operator ID may be an ID such as a company code.

The attribute information is information indicating an attribute of the director, and is, for example, information indicating whether or not the director is an external director, whether or not the director belongs to a nominating committee, etc. (nominating committee, compensation committee, and audit committee), whether or not the director is an independent director, or a duty of the director (for example, financial matters, personnel matters, and the like).

The term information is information indicating a term in which the director is (or has been) appointed as a director.

The display unit 140 can display a status of appointment of the director on the user terminal 300 on the basis of the director information.

That is, the display system 100 can acquire the director information in which the document content information is aggregated for each director on the basis of the document content information of the plurality of electronic documents acquired by the document content acquisition unit 130, and display the director information on the user terminal 300 through the processing by the display unit 140. As a result, the user can unitarily understand the information on the directors appointed by the business operator, and can perform reverse deduction on the basis of the director information to acquire the information on the directors and the business operator.

FIG. 9 is a diagram illustrating an example of display of the director information by the display unit 140. The screen illustrated in FIG. 9 includes, for example, an area 901 that displays the name of a director, an area 902 that indicates the term of appointment for each business operator, an area 903 that indicates detailed information of appointment for each business operator (for example, information corresponding to attribute information, a reason for appointment, and the like), and an area 904 that indicates a button for outputting displayed contents.

Figure 10:
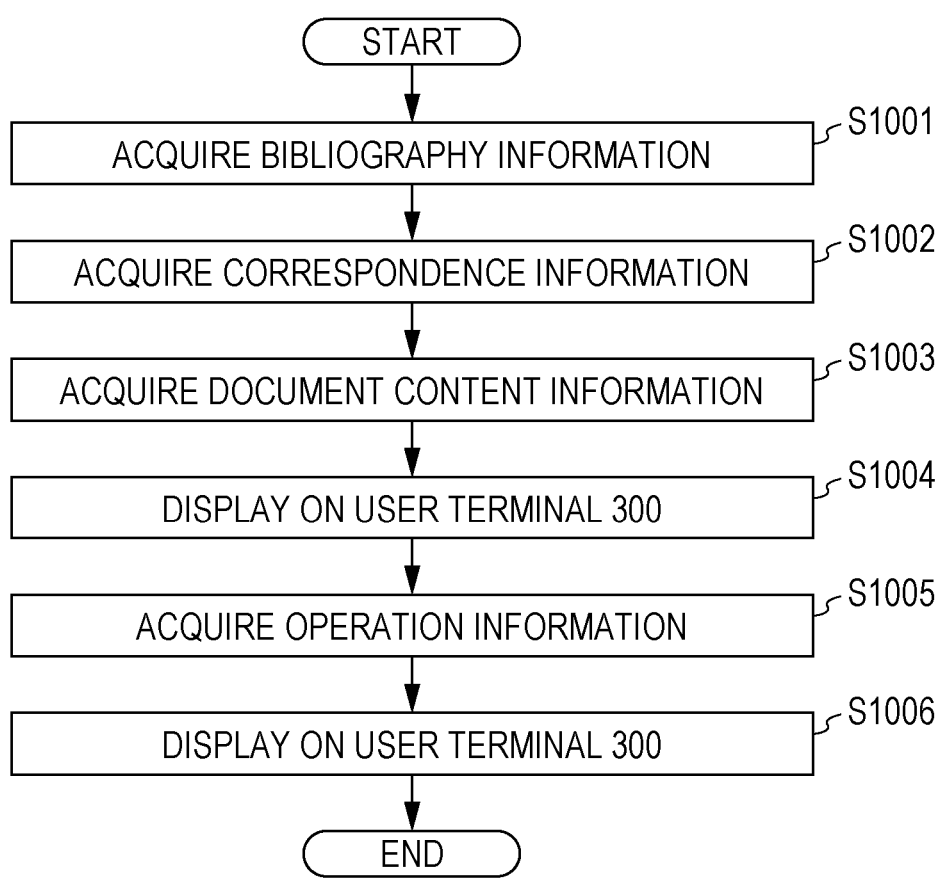
FIG. 10 is a flowchart illustrating an example of a process in the display system.

FIG. 10 is a flowchart illustrating an example of a process in the display system 100.

First, for example, the display system 100 acquires bibliographic information according to an operation of the administrator of the display system 100, and stores the acquired bibliographic information in the storage unit 110 (S1001). Subsequently, for example, the correspondence acquisition unit 120 acquires correspondence information indicating a correspondence between a plurality of items set in advance and the description position in the electronic document from the correspondence setting system 200. (S1002).

The document content acquisition unit 130 acquires the document content information of the electronic document to be displayed from the storage location indicated by the storage location information included in the bibliographic information (S1003). At this time, the document content acquisition unit 130 may acquire the document content information of the electronic document selected by the user from candidates of the electronic document, through the search processing by the display system 100 according to an operation of the user. The display unit 140 displays the content indicated in the document content information on the user terminal 300 for each item (S1004).

The operation information acquisition unit 160 acquires operation information regarding operation on the electronic document displayed on the user terminal 300 by the user (S1005). The selection display unit 170 displays the selected electronic document on the user terminal 300 according to the selection operation by the user (S1006).

<Modification>

Next, a modification of the display system 100 will be described.

The document content acquisition unit 130 temporarily acquires an electronic document (for example, a file in portable document format (PDF)) stored in the storage unit of the business operator system 400. Then, the document content acquisition unit 130 acquires (for example, extracts text) document content information (for example, the data entity of the electronic document) based on the temporarily acquired electronic document, and stores the document content information. Note that in this case, the document content acquisition unit 130 does not store the temporarily acquired electronic document itself. As a result, the display system 100 can display the content of the electronic document on the user terminal 300 without infringing the copyright of the electronic document.

Furthermore, items set in the correspondence setting system 200 may include an item group including a plurality of items. That is, the correspondence information may be correspondence information in which each of a plurality of item groups set in advance is associated with a description position in each of the electronic documents. In this case, the description position in the electronic document corresponding to the item group may be a set of description positions corresponding to each of the plurality of items included in the item group, or may be description positions where contents (for example, a particular chapter or item) corresponding to the item group are described.

Furthermore, the item set in the correspondence setting system 200 may include an item category including a plurality of item groups. That is, the correspondence information may be correspondence information in which each of a plurality of item categories set in advance is associated with a description position in each of the electronic documents. In this case, the description position corresponding to the item category may be a set of description positions corresponding to each of a plurality of the item groups included in the item category, or may be description positions at which contents (for example, a particular chapter or item) corresponding to the item category are described.

Specifically, for example, an item category "governance" may include an item group "stakeholder" and an item group "dialogue with stakeholders".

The item in the present embodiment can be appropriately replaced with an item group or an item category. That is, for example, the items in the areas 402 and 404 on the screen illustrated in FIG. 4, the items in the areas 502 and 504 on the screen illustrated in FIG. 5, and the items displayed in the areas 602 and 604 on the screen illustrated in FIG. 6 may be item groups or item categories.

In addition, the description position information included in the correspondence information may be information indicating a description position (for example, a region specified by a page number (page 1), an X coordinate (x1) of a start point, a Y coordinate (y1) of the start point, a width (w1), and a height (h1) in the electronic document. Moreover, the item information included in the correspondence information may further include information indicating an item group to which the item belongs and an item category to which the item group belongs.

The embodiment of the present invention has been described above. The display system 100 can acquire the document content information on the basis of the bibliographic information, and display the content indicated by the document content information corresponding to the description position in the electronic document, on the user terminal 300 of the user for each item on the basis of the correspondence information and the document content information. As a result, the display system 100 can display the content of the electronic document on the user terminal 300 in an easy-to-understand format.

Furthermore, the display system 100 can display the electronic document on the user terminal 300 according to a selection operation by the user to select a content to be displayed. In addition, at this time, the display system 100 can display on the user terminal 300 at least a part of the page of the page including the description position displayed on the user terminal 300. As a result, the user can refer to the electronic document to be referred to in detail in an easy-to-understand format.

Furthermore, the display system 100 can display a plurality of electronic documents issued at different times, a plurality of electronic documents issued by different issuing entities, or a plurality of electronic documents of different types, on the user terminal 300 for each item and for each element (that is, the issuance time, the issuing entity, or the type). As a result, the user can refer to the electronic document in an easy-to-understand format.

Note that the present embodiments are for facilitating understanding of the present invention and are not intended to limit the present invention. The present invention can be modified and improved without departing from the gist of the invention, and equivalents thereof are also included in the present invention.

What is claimed is:

1. A display system comprising:
    a document content acquisition unit that acquires, on a basis of bibliographic information that includes storage location information indicating a storage location of each of a plurality of electronic documents to be displayed and is related to a bibliographic matter of each of the plurality of electronic documents, document content information indicating a content of at least one electronic document among the plurality of electronic documents stored in the storage location;
    a correspondence acquisition unit that acquires correspondence information in which each of a plurality of items set in advance is associated with a description position where a content corresponding to each of the plurality of items in the at least one electronic document is described; and
    a display unit that displays, on a basis of the correspondence information and the document content information, the content indicated by the document content information and positioned at the description position in the at least one electronic document, on a user terminal of a user for each item.

2. The display system according to claim 1, further comprising a selection display unit that displays the at least one electronic document stored in the storage location according to a selection operation of selecting the content to be displayed by the user through the user terminal.

3. The display system according to claim 2, wherein the selection display unit displays at least a part of a page of the at least one electronic document including the description position on the user terminal when displaying the at least one electronic document according to the selection operation.

4. The display system according to claim 1, wherein
    the bibliographic information further includes issuance time information indicating an issuance time of each of the plurality of electronic documents,
    the document content acquisition unit acquires the document content information of each of the plurality of electronic documents issued at different times based on the bibliographic information, and the display unit displays the content indicated by the document content information on the user terminal of the user for each of the items and for each of the issuance times.

5. The display system according to claim 1, wherein the bibliographic information further includes issuing entity information indicating an issuing entity of each of the plurality of electronic documents, the document content acquisition unit acquires the document content information of each of the plurality of electronic documents issued by different issuing entities based on the bibliographic information; and the display unit displays the content indicated by the document content information on the user terminal of the user for each of the items and for each of the issuing entities.

6. The display system according to claim 1, wherein the bibliographic information further includes type information indicating a type of each of the plurality of electronic documents, the document content acquisition unit acquires the document content information of each of the plurality of electronic documents of different types based on the bibliographic information, and the display unit displays the content indicated by the document content information on the user terminal of the user for each of the items and for each of the types.

7. The display system according to claim 1, wherein the document content acquisition unit does not acquire the electronic document itself.

8. A display method in which a computer:

acquires, on a basis of bibliographic information that includes storage location information indicating a storage location of each of a plurality of electronic documents to be displayed and is related to a bibliographic matter of each of the plurality of electronic documents, document content information indicating a content of at least one electronic document among the plurality of electronic documents stored in the storage location;

acquires correspondence information in which each of a plurality of items set in advance is associated with a description position where a content corresponding to each of the plurality of items in the at least one electronic document is described; and displays, on a basis of the correspondence information and the document content information, the content indicated by the document content information and positioned at the description position in the at least one electronic document, on a user terminal of a user for each item.

9. The method according to claim 8, wherein the computer does not acquire the electronic document itself.

10. A non-transitory recording medium storing a display program causing a computer to implement:

a document content acquisition unit that acquires, on a basis of bibliographic information that includes storage location information indicating a storage location of each of a plurality of electronic documents to be displayed and is related to a bibliographic matter of each of the plurality of electronic documents, document content information indicating a content of at least one electronic document among the plurality of electronic documents stored in the storage location;

a correspondence acquisition unit that acquires correspondence information in which each of a plurality of items set in advance is associated with a description position where a content corresponding to each of the plurality of items in the at least one electronic document is described; and a display unit that displays, on a basis of the correspondence information and the document content information, the content indicated by the document content information and positioned at the description position in the at least one electronic document, on a user terminal of a user for each item.

11. The non-transitory recording medium according to claim 10, wherein the document content acquisition unit does not acquire the electronic document itself.

* * * * *